Patented May 15, 1934

UNITED STATES PATENT OFFICE 1,958,758

1,958,758

AZO DYESTUFFS

Hans Krzikalla, Ludwigshafen-on-the-Rhine, and Alfred Kirsch, Mannheim, Germany, assignors to General Aniline Works, Inc., New York, N. Y., a corporation of Delaware No Drawing. Application February 13, 1933, Serial No. 656,584. In Germany February 23, 1932

6 Claims. (Cl. 260—77)

The present invention relates to new azo dyestuffs and process of producing same.

We have found that very valuable azo-dyestuffs are obtained by coupling tetrazotized diamino compounds obtainable by condensing 2 molecular proportions of an aromatic amine with one molecular proportion of an aliphatic ketone, with derivatives of benzene containing at least one hydroxy group, attached to the benzene nucleus, all of the initial components being free from sulpho and carboxyl groups. The dyestuffs correspond to the general formula:

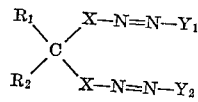

wherein $R_1$ and $R_2$ stand for an aliphatic radicle, X for an aromatic radicle and $Y_1$ and $Y_2$ for a benzene radicle containing at least one hydroxy group; $R_1$ and $R_2$ may be equal or different aliphatic radicles. Suitable diamino compounds are for example the compounds obtainable by condensing 2 molecular proportions of aniline, ortho- or meta-toluidine, aminohydroquinone dimethyl ether or ortho-anisidine with 1 molecular proportion of acetone or its homologues. As coupling components may be mentioned for example paracresol and its substitution products which yield dyestuffs which are very fast to light; further suitable coupling components are for example 4-chlor-3-methylphenol, 2,4-dimethylphenol and the methyl ether of hydroquinone.

The dyestuffs are usually soluble in oil and other organic solvents and may be employed for example for coloring varnish lacquers, oil varnishes and for the preparation of intaglio printing inks, the dyeings obtained have from yellow to orange shades.

The following examples will further illustrate the nature of this invention but the invention is not restricted to these examples. The parts are by weight.

Example 1

22.6 parts of the condensation product from 1 molecular proportion of acetone and 2 molecular proportions of aniline are tetrazotized in dilute hydrochloric acid with sodium nitrite in the usual manner and allowed to flow into a solution of 23 parts of para-cresol in caustic soda solution containing an excess of soda. When coupling is complete, the dyestuff is filtered off by suction and washed until neutral. The dried dyestuff is yellow and has an excellent fastness to light. It may be employed for example for coloring varnish lacquers or oil varnishes.

The dyestuff prepared by coupling with para-cresol the tetrazotized condensation product from 2 molecular proportions of ortho-toluidine and 1 molecular proportion of acetone has similar properties. Instead of para-cresol, for example 4-chlor-3-methyl-phenol, 2.4-dimethyl-phenol or mixtures of para-cresol and ortho-cresol may be used as coupling components.

Example 2

28.6 parts of the condensation product derived from 1 molecular proportion of acetone and 2 molecular proportions of ortho-anisidine are tetrazotized and coupled with 23 parts of para-cresol in alkaline solution as described in Example 1. The resulting dyestuff is somewhat more reddish than that obtained according to Example 1 and is likewise very fast to light.

A dyestuff which is still more reddish is obtained by employing the tetrazo compound of the condensation product derived from 1 molecular proportion of acetone and 2 molecular proportions of aminohydroquinone dimethyl ether.

Example 3

22.6 parts of the condensation product of 1 molecular proportion of acetone and 2 molecular proportions of aniline are tetrazotized in the usual manner and the tetrazo compound obtained is coupled in alkaline solution with 23 parts of the methyl ether of hydroquinone. The product is filtered off and washed. It dissolves in a commercial nitrocellulose lacquer, coloring the latter golden yellow tints of good fastness to light.

What we claim is:—

1. Azo dyestuffs corresponding to the general formula

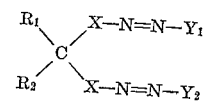

wherein $R_1$ and $R_2$ stand for an alkyl radicle, X for an aromatic radicle of the benzene series and $Y_1$ and $Y_2$ for a benzene radicle containing at least one hydroxy group, the said dyestuffs being free from sulpho and carboxyl groups, yielding from yellow to orange dyeings and usually being soluble in organic solvents.

2. Azo dyestuffs corresponding to the general formula

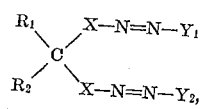

wherein $R_1$ and $R_2$ stand for two equal alkyl radicles, X for an aromatic radicle of the benzene series and $Y_1$ and $Y_2$ for a benzene radicle containing at least one hydroxy group, the said dyestuffs being free from sulpho and carboxyl groups, yielding from yellow to orange dyeings and usually being soluble in organic solvents.

3. Azo dyestuffs corresponding to the general formula

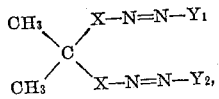

wherein X stands for an aromatic radicle of the benzene series and $Y_1$ and $Y_2$ for a benzene radicle containing at least one hydroxy group, the said dyestuffs being free from sulpho and carboxyl groups, yielding from yellow to orange dyeings and usually being soluble in organic solvents.

4. The yellow azo dyestuff corresponding to the formula

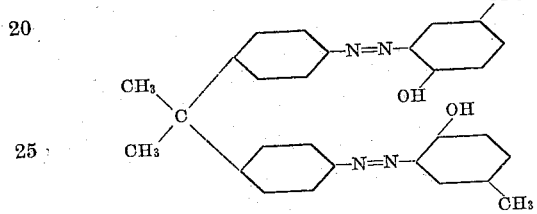

said dyestuff having an excellent fastness to light.

5. The reddish yellow azo dyestuff corresponding to the formula

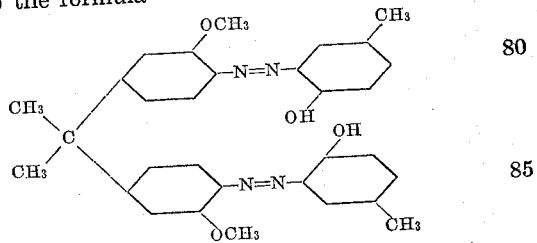

said dyestuff having an excellent fastness to light.

6. The yellow azo dyestuff corresponding to the formula

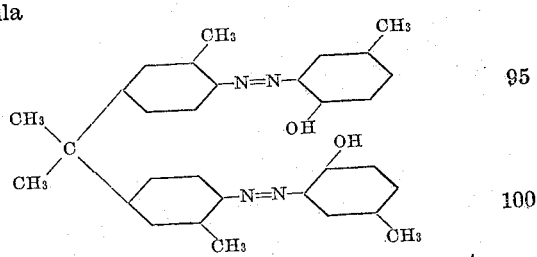

said dyestuff having an excellent fastness to light.

HANS KRZIKALLA.
ALFRED KIRSCH.